Figure 1:
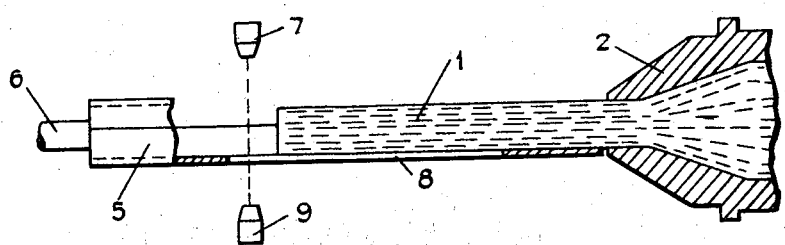

April 14, 1964   W. CUNNINGHAM   3,128,500
APPARATUS FOR CUTTING CONTINUOUSLY EXTRUDED MATERIAL
Filed April 25, 1961   3 Sheets-Sheet 1

INVENTOR
WILLIAM CUNNINGHAM

BY Cushman, Darby & Cushman
ATTORNEYS

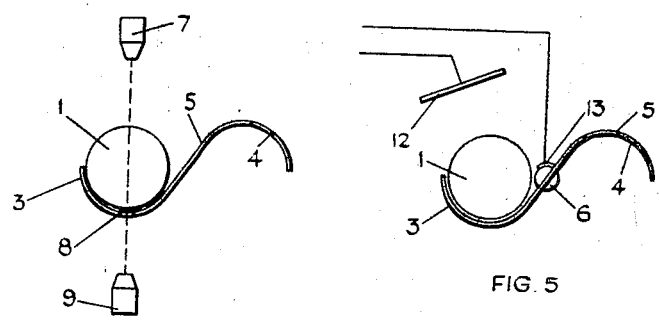
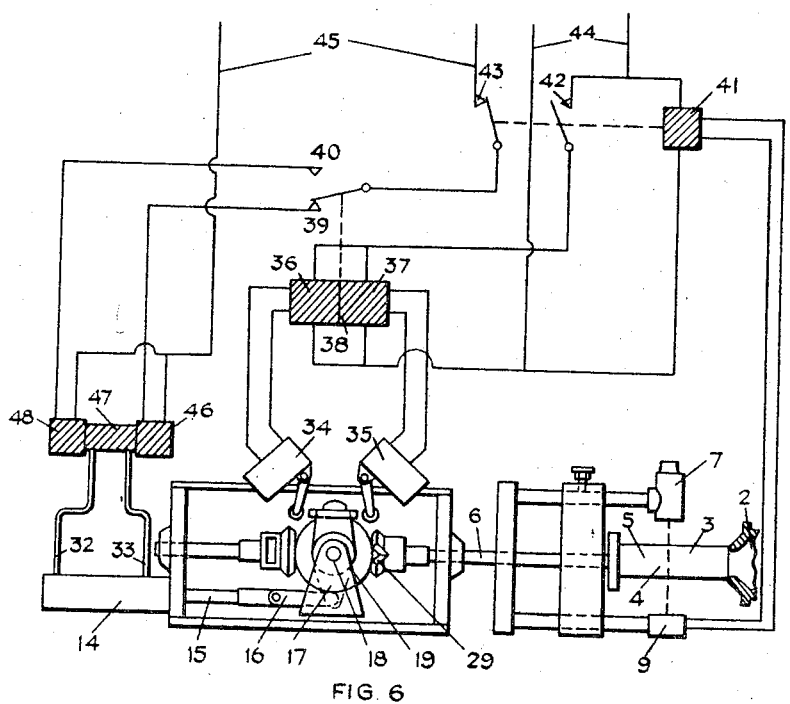

April 14, 1964    W. CUNNINGHAM    3,128,500
APPARATUS FOR CUTTING CONTINUOUSLY EXTRUDED MATERIAL
Filed April 25, 1961    3 Sheets-Sheet 3

INVENTOR
WILLIAM CUNNINGHAM

BY Cushman, Darby & Cushman
ATTORNEYS

United States Patent Office 3,128,500
Patented Apr. 14, 1964

3,128,500
APPARATUS FOR CUTTING CONTINUOUSLY EXTRUDED MATERIAL
William Cunningham, Stevenston, Scotland, assignor to Imperial Chemical Industries Limited, London, England, a corporation of Great Britain
Filed Apr. 25, 1961, Ser. No. 105,426
Claims priority, application Great Britain Apr. 25, 1960
6 Claims. (Cl. 18—12)

This invention relates to an improved apparatus for dividing a continuously extruded column of plastic material into predetermined equal lengths.

During their manufacture or processing many materials have at some stage a plastic consistency, and it is usually convenient to shape the material into blocks, cylinders or other shapes while it is in this plastic condition. This shaping may be effected by extruding the material through a nozzle and cutting the extruded column into convenient lengths. In many cases, e.g. in shaping blocks of toffee, ice-cream and soap, or in making cartridges of explosives, these lengths are required to be approximately equal. The extruded lengths may be measured and cut by hand, but for large scale manufacture it is desirable that the plastic material should be divided into equal portions by mechanical means; and many machines have been devised for this purpose. Some machines achieve separation of the extruded material into equal portions by extruding material under pressure into one or more cells of equal dimension until the cells are filled to a predetermined level, stopping the extrusion and ejecting the material thus divided. Such machines are discontinuous in operation, and machines in which the plastic material is extruded in a continuous column and subsequently divided into equal lengths are more efficient and are therefore preferred. Division of the continuously extruded column is effected by a cutting means usually consisting of a knife or wire arranged to traverse the column of material at substantially equally spaced positions. When the extruded column travels at an approximately uniform rate the material can be divided into approximately equal lengths by arranging cutting means to act at equal intervals of time.

If, however, as is often the case, the rate of extrusion is not uniform, the action of the cutting means must be adjusted to the required frequency by making it dependent on the rate of extrusion. In this case the cutting means has frequently been made to operate as a result of the extruded portion of the material being increased by a pre-determined length. This may be done by mechanical means; for example, if the extruded material is sufficiently rigid it can be cut into equal lengths by causing the column from the extruder to engage knives or other cutting means equally spaced around the circumference of a wheel which is made to revolve by the thrust applied by the extrusion machine to the extruded column. In other machines the column has been arranged to operate an electric switch or pneumatic or hydraulic valve when a predetermined portion has been extruded, this switch or valve in turn being made to control the cutting means.

For various reasons these mechanical means are not commercially applicable to all extruded plastics. One reason for this is that the extruded material is required to transmit the mechanical energy necessary to actuate the cutting means, which limits the plasticity of the material which can be worked thereby, and the apparatus required is rather cumbersome. In particular these methods have hitherto been generally inapplicable to the division of extruded columns of high explosives, which are usually of a soft plastic consistency. Normally these explosives are extruded by worm extruders into columns of uniformly circular cross section and are required to be cut into cylinders of equal length. The rate of extrusion can vary widely due to variation in the consistency of the material.

The object of the present invention is to provide a convenient means for dividing into equal lengths an extruded column of any plastic material which can be slidingly propelled without distortion along a supporting surface in a horizontal direction for at least a distance equal to one of the lengths into which the material is to be divided.

In one embodiment of the present invention an apparatus for dividing a continuously extruded column of plastic material into predetermined equal lengths consists of a supporting surface for presenting to the extruded column a supporting surface disposed forwardly of the locus of emergence of the column from the shaping means, along which surface the column is slidingly advanced wholly or at least partly by the action of the extrusion means so that the advance of the column to a predetermined position actuate a detector means disposed in its entirety outwith the path of the advancing column. The column is then cut at a predetermined locus behind the advancing front with means the supporting surface which is actuated by the response of the detector means to the advance of the front of the column to a predetermined detection position. The supporting surface then immediately moves the cut column of material outwith the path of the advancing front and presents once more a supporting surface to the continuously advancing unbroken column.

The structure providing the said supporting surface may be fabricated from any material capable of giving adequate support to a length of extruded column at least equal to one of the equal lengths into which the column is being divided. Although a plane surface may be used it is usually desirable that the supporting surface should be concavely curved or one presented by a polygonal structure. Structures made of sheet metal, plastic, glass or the like may conveniently be used but where the extruded material is explosive a metal or alloy which does not emit sparks when struck by hard objects, for example brass, is preferred. The supporting surface may, if desired, be coated with compounds such as polytetrafluoroethylene or treated with any suitable conventional lubricant to reduce the tendency of the extruded material to stick to it.

The structure providing the supporting surface may be permanently fixed in a position forward of but preferably close to the extruder nozzle, and if so the predetermined length of column must be removed from said surface immediately after it is separated from the continuously emergent column, so as to allow the newly formed column front to advance.

In a modified form of the invention the structure providing the supporting surface may be hinged along one of its sides and arranged so that immediately after the predetermined length has been severed from the advancing column it swings out of its position to drop off the severed portion of the extruded column and immediately swings back to its original position to support the next portion of the advancing column.

In another form of the invention the structure providing the supporting surface instead of reciprocating may be so movable that after the predetermined length of column has been deposited thereon, it is removed together with the cut length of plastic material to a position entirely outwith the path of the advancing column and another similar supporting surface is simultaneously moved into a position to support the advancing column.

A convenient arrangement of supporting surfaces which can be successively presented to the continuously extruded column is one in which a plurality of the structures providing such surfaces is disposed on an intermittently movable conveyor which, immediately the predetermined portion is severed from the extruded column of material, is moved through a suitable distance to remove the predetermined portion of plastic material from the path of the advancing column and to position a second supporting surface to support the advancing column. The movable conveyor to which the structures providing supporting surfaces are attached can be an endless belt, or the surface of a rotatable cylinder. The structures providing the supporting surfaces may also be attached to or rigidly supported by radially disposed arms or the circumference of a circular disc which can be rotated to bring the supporting surfaces into the correct position to support the column after extrusion. The structures providing the supporting surface may move in the plane of the direction of motion of the extruded column but it is usually more convenient for the movement to be perpendicular to the direction of extrusion.

A particularly convenient and preferred arrangement of supporting surfaces is one in which two structures providing supporting surfaces are joined together along a line which is a common linear axis for the thus combined structures providing supporting surfaces, around which the structures providing the two surfaces can be intermittently rotated, such axis being disposed parallel to the direction of emergence of the plastic material from the column forming means but lying outwith the path of the extruded column.

The supporting surface may be so disposed with relation to the nozzle of the extruder that the relative motion between the structures providing the aforesaid supporting surfaces and the forward end of the extruder nozzle itself shears the column of extruded plastic material, thus obviating the need for a separate cutting means. The supporting surfaces are preferably such as to maintain the path of the extruded material along a straight line as it advances from the nozzle, and in the case of a cylindrical column it is preferable for the surfaces to be curved in section in the direction perpendicular to the said direction of motion of the column. When the structures providing the two supporting surfaces are combined as described along a line which forms an axis around which the combined structure can be rotated, the curvatures of the two surfaces are in opposite directions, so that the cross section of the combined structure providing the supporting surfaces is S-shaped. This curvature helps to prevent deviation of the advancing column from a straight path.

The detector means disposed wholly outwith the path of the extruded column responds to the presence of a predetermined portion of the length of the advancing extruded column within its field of detection.

The means for removing the divided portion of the extruded column to a position outwith the path of the advancing column may consist in a mechanically operated device, for example a piston or paddle timed to act immediately the cutting means has severed the column. It is preferred, however, to move the divided portions of the column by moving the structures providing the supporting surface with the portion still resting thereon and to arrange for the movement to be continued until a position is reached where the plastic material falls by gravity from the said surface.

In a convenient form of the invention the detector means consists of a light source located adjacent to but outwith the path of the extruded column and arranged to transmit a beam of light across the path of the column and through a suitably disposed slit in the supporting means when the said supporting means is in position to support the advancing column, and a similarly located photoelectric cell on which the light beam impinges when there is no material to intercept the beam, thereby causing a current to pass through an electric relay connected in circuit with the photoelectric cell which can be used to control the operation of the cutting means. When the end of the advancing column intercepts the path of the light beam the current through the photoelectric cell and the relay ceases. The relay is arranged to respond to this current drop by completing a second circuit which energises a solenoid of an electropneumatic valve which acts through a suitable gear train to operate the cutting means and effect the removal of the severed portion of the extruded column from the path of the advancing column. When the aforedescribed form of combined supporting surfaces and cutting means, in which two structures providing the supporting surfaces are joined so as as to be rotatable about a common axis is used, a shaft leading from the gear train is attached to the structures providing the supporting surfaces and arranged to rotate through 180° in response to a current drop in the photoelectric cell. This provides the means for removing the divided portion of the column on one of the supporting surfaces out of the path of the advancing column and moving the other supporting surface into position to receive the next portion of the column to be divided. In this form of the invention the detector means is required to control the rotation of the structures providing the supporting surfaces and to effect separation of the column into equal lengths. The signal from the detector means may also be conveniently used to synchronise operations which are required to be performed on the divided portions of the column, for example, wrapping operations.

In another form of the invention the detector means consists of a beam of radiation from a radioactive source, for example, of $\beta$, or $\gamma$-radiation, which is located adjacent to but outwith the path of the advancing extruded column, and which transmits a beam of ionising radiation to a suitable detector for such radiation, also located outwith the path of the advancing column, in such a manner that the beam of radiation traverses the said path of the column. The detector for the beam of ionising radiation may be for example a Geiger tube or a scintillation counter. The drop in the intensity of the radiation reaching the detector when the extruded column enters the path of the beam can be made to operate an electric relay which by controlling suitable electric circuits can effect the operation of the cutting means and the means of removing the divided length from the path of the advancing column, and can also be used to synchronise further operations which have to be carried out on the separate equal lengths of plastic material.

In still another form of the invention the detector means consists of an electrode system located outwith but adjacent to the path of the extruded column and a means of measuring the capacitance of the field between the electrodes, arranged so that the change in capacitance resulting from the entry into the field of predetermined portion of the extruded column causes the operation of the cutting means and the consequent removal of the divided length of material from the path of the advancing column.

The cutting means of the invention that is actuated as a result of the signal from the detector means to traverse the path of the extruded column may take several forms, for example it may consist of a knife made of metal, wood or other suitable material, or it may be in the form of one or more wires. The point at which the cutting means acts on the column may be at some distance from the point of emergence of the column from the extrusion means but it is generally preferred that it should be close to the extrusion means to keep to a minimum the distance which the extruded column is required to travel. When, however, the materials being extruded are expsoive there is preferably some small but definite clearance between the cutting means and the extrusion means. The cutting means may be separate from the structure providing the supporting surface or it may be attached to the movable structure providing the supporing surface so that it is operated by movement of the structure providing the surface when such movement is used to convey the equally divided portion of the column outwith the path of the advancing column. In a particularly convenient form of the invention the edge of the structure providing the supporting surface nearest to the extrusion means acts as the cutting means by moving relative to the forward end of the extruder nozzle so that the advancing column of extruded material is sheared.

It will be appreciated that the operation of the cutting means in response to the effect of the advancing column on the detector means must result in the extruded column being cut into successive equal lengths, even if the linear rate of extrusion changes, provided the column is a sufficient rigidity to maintain its shape while being propelled slidingly over a distance at least equal to the length into which it is to be cut.

A preferred embodiment of the invention will now be described with reference to the accompanying drawings. This embodiment is adapted to the cutting of continuously extruded cylindrical cords of plastic material into equal lengths and is suitable for cutting cords of extruded explosive materials.

Figure 2:
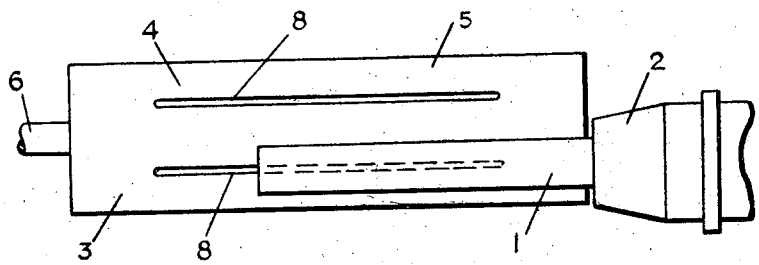
Figure 3:
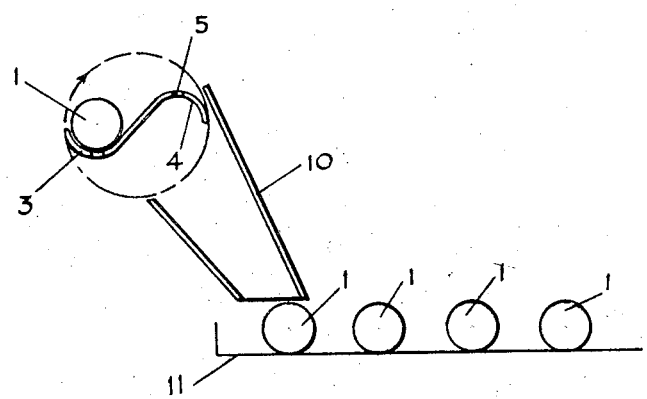

FIGURES 1–5 illustrates diagramatically the arrangement of the structures providing the supporting surfaces for the extruded column of plastic material and the detector means which is used to control the cutting of the said column. FIGURE 1 shows diagrammatically in partly sectioned elevation a column of plastic material 1 being extruded from an extruder 2 of known type, and advanced along the supporting surface of a structure 5. As seen in FIGURES 2 and 3 the supporting surface 3 and a similar supporting surface 4, the latter in its inoperative position, are provided by the structure 5 which is of S-shaped cross section and is rigidly attached to a shaft 6 by which it is rotated about its linear axis. The detector means shown in FIGURE 1 consists of a light source 7 which transmits a beam of light through a slit 8 to a photoelectric cell 9. The positions of light source 7 and the photoelectric cell 9 are adjustable to permit the light beam to pass through the slit 8 at any predetermined position thus allowing the length of the divided portions of the column of plastic material to be adjusted as desired.

FIG. 2 shows in plan view the diagrammatic arrangement of the column of plastic material 1, the extrusion machine 2, and the supporting surfaces 3 and 4.

FIGURES 3, 4 and 5 show diagrammatically views of the column of plastic material 1 and the structure 5 providing the supporting surfaces 3 and 4 viewed from the end adjacent to the extruder 2. FIGURE 3 also illustrates how the structure 5 is rotated to cut the extruded column of plastic material 1 and discharge the divided portions down a chute 10 to a conveyor 11. FIGURE 4 shows the position of the aforesaid light source and photoelectric cell. FIGURE 5 shows the position of alternative detector means used in place of the photoelectric detector means in a variation of the preferred embodiment, which consists of an electrode system, by which changes in capacitance resulting from the column of plastic material 1 entering the field between the electrodes are detected. The plate 12 is used as one electrode and the structure 5 serves as the other electrode, electrical contact to the latter being made by a carbon brush 13 sliding on the shaft 6.

When the forward end of the advancing column of plastic material 1 reaches a position where it intercepts the light beam of the detector means shown in FIGURE 1 the current through the photoelectric cell 9 consequently ceases and by means of suitable electric, pneumatic and mechanical apparatus the shaft 6 is made to rotate through 180° very rapidly, thereby shearing the extruded portion of the plastic column 1 and discharging the cut portion into the chute 10, by relative movement between the end of the structure 5 providing the supporting surface and the nozzle of the extruder 2. The supporting surface 4 simultaneously comes into position to receive the next portion of the extruded column of plastic material 1. In machines adapted for cutting exposive materials the structure 5 is positioned to leave a small but definite clearance between the edge of the said structure and the nozzle of the extruder 2.

FIGURE 6 shows diagrammatically the arrangement of apparatus whereby the structure 5 providing the supporting surfaces 3 and 4 can be rotated through an angle of 180° when the extruded column intercepts the beam of light impinging on the photoelectric cell 9. The electrical circuits are so arranged that when the current ceases to flow in the photoelectric cell 9 air is admitted from a compressed air supply alternately to each end of the double acting air cylinder 14, which the result that the piston rod 15 reciprocates horizontally making a movement first to the left in response to one interception of the light beam and then to the right in response to the next interception of the beam. The outer end of the piston rod 15 is connected through a link 16 to an oscillating lever 17 operating on a fulcrum pin 18. A bevel gear wheel 19, also centred on fulcrum pin 18 is fixed to the lever 17 so that it rotates alternately clockwise and anticlockwise as the lever 17 is rotated alternately clockwise and anticlockwise by the reciprocating movement of the piston rod 15. The stroke of the piston rod 15 is such that the lever 17 and the bevelled gear wheel 19 rotate through an angle of 90° in response to a complete movement of the piston rod 15 in one direction.

Figure 7:
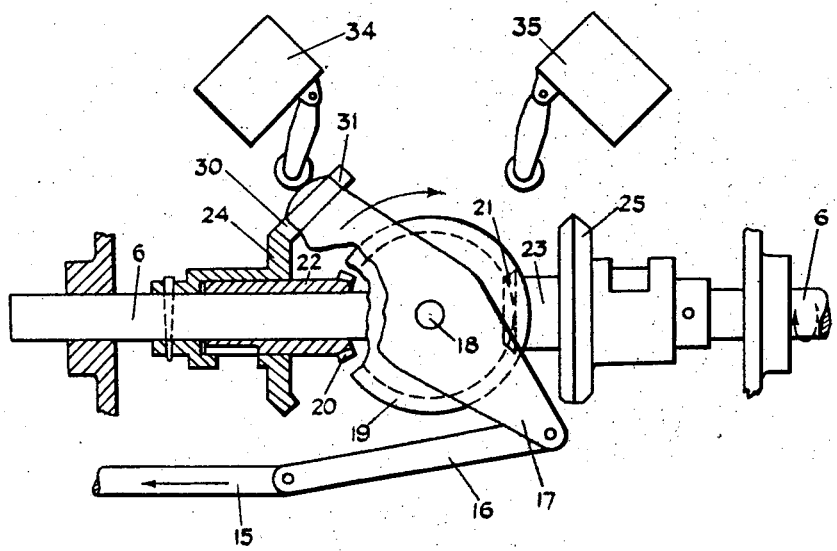

The extent of this movement is illustrated in greater detail in FIGURE 7 which also shows the detailed arrangement of the driving mechanism for imparting rotational movement to the shaft 6. Two bevelled gear wheels 20 and 21 are mounted so that they can freely rotate on the shaft 6 and are positioned to be in mesh constantly with bevel gear wheel 19 at diametrically opposite positions thereon. Each of the bevelled gear wheels 20 and 21 has half the number of teeth contained on bevelled gear wheel 19. Thus, when bevelled gear wheel 19 rotates through 90°, each of the bevelled gear wheels 20 and 21 is driven by it through 180°, one in a clockwise and the other in an anticlockwise direction, when viewed from the same end of the shaft 6. These directions are reversed when the piston rod 15 reverses on its return stroke.

Figures 8, 9:
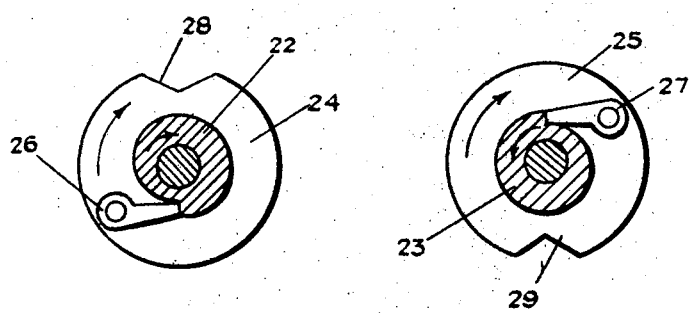

The hubs of bevelled gear wheels 20 and 21 are extended to form long sleeves 22 and 23 through which the shaft 6 passes. On the outside of the sleeves 22 and 23 are mounted index locking parts 24 and 25 which are both pinned to shaft 6. Spring loaded pawls 26 and 27, shown in FIGURES 8 and 9, are pinned to the index locking parts 24 and 25 respectively and work in conjunction with facings on the outside of the sleeves 22 and 23 respectively, to provide ratchet type drives. The bevelled gear wheels 20 and 21 are thus allowed to rotate freely inside the index locking parts 24 and 25, in one direction, but when moved in the other direction they engage the pawls 26 and 27 and drive the index locking parts 24 and 25 and the shaft 6 in that direction. When the bevelled gear wheel 20 is driving the index locking part 24 through pawl 26, the shaft 6 and the index locking part 25 also rotate in the same direction as the index locking part 24 since the index locking parts 24 and 25 are both pinned to the shaft 6. At the same time the bevelled gear wheel 21 is rotated in the opposite direction by the bevelled gear wheel 19 and the pawl 27 rises up the ratchet face on sleeve 23. Since the stroke of the piston rod 15 produces an angular displacement in the bevelled gear wheel 20 of 180° in one direction and simultaneously an angular displacement in the bevelled gear wheel 21 of 180° in the opposite direction, relative angular displacement of 360° between the bevelled gear wheels 20 and 21 is produced. The spring loaded pawl on the index locking part 25 therefore comes into the engaged position when the piston rod 15 reaches the end of its stroke. During the return stroke of the piston rod 15 the directions of rotation of the bevelled gear wheels 20 and 21 are both reversed, and the index locking part 25 is driven by pawl 27, carrying with it the shaft 6 and the index locking part 24. The shaft 6 is thus always rotated in the same direction.

To ensure that the exact rotational movement is imparted to the shaft by each movement of the piston rod 15, notches 28 and 29 are provided in the index locking parts 24 and 25 respectively and are positioned so as to engage locking wedges 30 and 31 attached to the oscillating lever 17. These locking wedges are of triangular cross section and therefore serve to control the exact location of the index locking parts 24 and 25 and consequently of the supporting surfaces 3 and 4 while the plastic column 1 is being extruded.

The arrangement of the electric and pneumatic apparatus which actuate the alternate movements of the piston rod 15 and the consequent rotation of the structure providing the supporting surfaces 3 and 4 is shown in FIGURE 6. Movement of the piston rod 15 in one direction, say toward the right, is effected by admitting air to the double acting air cylinder 14 through the air pipe 32, and movement in the reverse direction is effected by admitting compressed air to the other side of the double acting air cylinder 14 through the air pipe 33. The supply of compressed air through the pipes 32 and 33 alternately is effected by the alternate closing of the microswitches 34 and 35 by one end of the oscillating lever 17. When the oscillating lever 17 is in the position shown in FIGURE 7 the microswitch 34 is in the closed position and the microswitch 35 is open. The microswitches 34 and 35 are connected in circuit with the coils 36 and 37 respectively of a latching relay 38 which effects the alternate closing and opening of the relay contacts 39 and 40.

While the column of plastic material 1 is being extruded light source 7 projects a beam of light on to the photoelectric cell 9 and current flows through the electric relay 41 holding the relay contact 42 in the closed position and contact 43 in the open position. Current then flows through the relay supply circuit leads 44 thereby energising either the relay coil 36 or 37 whichever is in circuit with the microswitch which is at that time closed, and the corresponding relay contact 39 or 40 will be closed. If, with the piston rod 15 moved to the right as shown in FIGURE 7 the relay coil 36 is energised and the relay contact 39 is closed, an electric circuit is prepared so that when the light beam impinging on the photoelectric cell 9 is interrupted by the column of plastic material 1 and the relay contact 43 is closed, a current flows in the solenoid supply circuit leads 45, the solenoid 46 of an electro-pneumatic valve 47 is energised and compressed air is permitted to flow through the air pipe 33 thereby moving the piston rod 15 rapidly to the left. This results in the rotation of the structure 5 providing the supporting surfaces as previously described. The microswitch 35 and the contact 42 are now closed, the relay coil 37 is energised, the contact 40 is closed and contact 39 is open. On the next interruption of the light beam impinging on the photoelectric cell 9 an electric current flows through the solenoid 48 of the electro-pneumatic valve 47, compressed air is admitted through air pipe 32 and piston rod 15 is moved again to the right.

With apparatus as described the delay between the interruption of the light beam and the rotation of the shaft 6 is extremely small, and the rate of rotation can be extremely rapid. For example in an apparatus used to cut cylindrical columns of explosive material 1¼" in diameter there was only 0.1 second between the interruption of the beam and the completion of the cutting of the extruded column. Of this time, the time taken for the structure 5 providing the supporting surfaces and also the cutting means to traverse the diameter of the extruded column was only about 0.025 second, so that with extrusion rates of about 6 inches per second the direction of the cut only varied from the normal to the axis of the column by about 6°, which was not significant with this product, and in the case of any plastic material could easily be rectified by slight pressure on the end of the column in a subsequent operation.

What I claim is:

1. Apparatus for dividing a continuously extruded column of plastic material into predetermined equal lengths comprising: shaping means provided with an extruder nozzle for extruding a continuous column of plastic material; support means disposed forwardly of said nozzle for receiving the extruded column, said support means including a rotatable shaft disposed parallel to the extrusion axis of said nozzle and outside the path of the moving extruded column, said support means further including means carried by said shaft defining at least two generally concave support surfaces, said surfaces facing in the direction of rotation of said shaft; and means for intermittently rotating said shaft through an arc whereby a length of the continuously moving extruded column is supported by one of said surfaces when said shaft is stationary and whereby when said shaft is rotated through said arc the supported length is moved out of the path of the column and the next surface simultaneously receives the still moving column without any portion of said next surface crossing the path of said column.

2. Apparatus as in claim 1 wherein said surface defining means are thin in a cross section transverse to said shaft so as to serve as shearing means for shearing the lengths from the forward end of the moving extruded column.

3. Apparatus for dividing a continuously extruded column of plastic material into predetermined lengths comprising: shaping means provided with an extruder nozzle for extruding a continuous column of plastic material along a path; conveyor means disposed forwardly of said nozzle for moving a severed length of the moving column out of the path of the column and for immediately supporting a next length which is still integral with the moving column without displacing any of the next length from the extrusion path, said means defining at least two supporting surfaces extending generally parallel to the extrusion path and means for intermittently moving said supporting surfaces across the extrusion path, said supporting surfaces facing generally in the direction of the movement so as to present no structure which will cross the extrusion path between the time of removal of the severed length of column and the time of arrival of a supporting surface at a position to support the next length of column.

4. Apparatus as in claim 3 wherein said means for moving said supporting surfaces includes a rotatable shaft disposed parallel to the extrusion path and wherein said supporting surfaces are carried by said shaft in generally radial relationship thereto.

5. Apparatus as in claim 3 wherein each supporting surface is a concave surface facing generally in the direction of its movement.

6. Apparatus as in claim 4 wherein there are two supporting surfaces defined by a structure which is generally S-shaped in transverse cross section, the junction of the two concave surfaces of the S lying substantially on the axis of said shaft.

References Cited in the file of this patent

UNITED STATES PATENTS

| | | |
|---|---|---|
| 294,519 | Smith | Mar. 4, 1884 |
| 379,795 | Livingston et al. | Mar. 20, 1888 |
| 615,582 | Snell | Dec. 6, 1898 |
| 676,635 | Snell | June 18, 1901 |
| 885,809 | Waggoner | Apr. 28, 1908 |
| 1,591,556 | Jones | July 6, 1926 |
| 1,881,397 | Bowling | Oct. 4, 1932 |
| 2,371,709 | Rineer | Mar. 20, 1945 |
| 2,854,691 | Strong | Oct. 7, 1958 |

FOREIGN PATENTS

| | | |
|---|---|---|
| 803,367 | Great Britain | Oct. 22, 1958 |